United States Patent [19]

Donnelly et al.

[11] Patent Number: 5,965,272

[45] Date of Patent: Oct. 12, 1999

[54] COLOR-PLUS-CLEAR COMPOSITE COATING COMPOSITIONS CONTAINING ALKOXYSILANE FUNCTIONAL POLYMERS

[75] Inventors: Karen D. Donnelly, Allison Park; Charles M. Kania, Natrona Heights; Michael A. Mayo, Pittsburgh; William E. Michael, Gibsonia; Shanti Swarup, Allison Park, all of Pa.

[73] Assignee: PPG Industries Ohio, Inc., Cleveland, Ohio

[21] Appl. No.: 08/959,995

[22] Filed: Oct. 29, 1997

[51] Int. Cl.$^6$ ........................................ B32B 9/04
[52] U.S. Cl. ................ 428/447; 528/28; 528/32; 528/45; 526/279; 525/100; 525/107
[58] Field of Search .................... 528/28, 32, 45, 528/59; 526/279; 525/100, 107, 123, 165, 258; 427/44

[56] References Cited

U.S. PATENT DOCUMENTS

| | | | |
|---|---|---|---|
| 4,403,953 | 9/1983 | Chang et al. | 260/18 S |
| 4,503,181 | 3/1985 | Kato et al. | 524/391 |
| 4,578,417 | 3/1986 | Furukawa et al. | 524/378 |
| 4,939,213 | 7/1990 | Jacobs et al. | 525/329.9 |
| 5,204,404 | 4/1993 | Werner, Jr. et al. | 524/501 |
| 5,281,636 | 1/1994 | Nambu et al. | 524/378 |
| 5,356,996 | 10/1994 | Nakao et al. | 525/158 |
| 5,399,607 | 3/1995 | Nanbu et al. | 524/385 |
| 5,532,027 | 7/1996 | Nordstrom et al. | 427/493 |
| 5,602,204 | 2/1997 | Harimoto et al. | 525/209 |
| 5,684,084 | 11/1997 | Lewin et al. | 524/590 |

FOREIGN PATENT DOCUMENTS

| | | |
|---|---|---|
| 0 050 249 | 4/1982 | European Pat. Off. . |
| 276469 | 8/1988 | European Pat. Off. . |
| WO 96/25466 | 8/1996 | WIPO . |

*Primary Examiner*—Melvyn I. Marquis
*Assistant Examiner*—Mark W. Milstead
*Attorney, Agent, or Firm*—William J. Uhl; Krisanne Shideler

[57] ABSTRACT

A storage-stable, curable film-forming composition is provided comprising: (i) a crosslinking agent selected from an aminoplast, a blocked polyisocyanate, and mixtures thereof; and (ii) a hydroxyl functional acrylic polymer further containing a plurality of alkoxysilane groups of the structure:

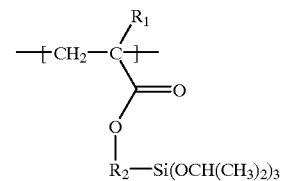

wherein $R_1$ is hydrogen or methyl, and $R_2$ is a divalent group.

The acrylic polymer is prepared in a solvent medium comprising an alcohol. The curable film-forming composition is suitable for use in color-plus-clear composite coating compositions.

40 Claims, No Drawings

COLOR-PLUS-CLEAR COMPOSITE COATING COMPOSITIONS CONTAINING ALKOXYSILANE FUNCTIONAL POLYMERS

FIELD OF THE INVENTION

The present invention relates to curable film-forming compositions and to color-plus-clear composite coating compositions.

BACKGROUND OF THE INVENTION

In the coatings industry, resistance to etching by atmospheric acid precipitation ("acid etch resistance") has become a desirable property for coatings, particularly automotive original equipment coatings. Original equipment manufacturers are requiring that coating systems demonstrate acid etch resistance. Several chemistries have been developed that demonstrate acid etch resistance. An example is alkoxysilane chemistry, in which alkoxysilane functional polymers (typically acrylics) self-condense (or additionally react with crosslinking agents) to form crosslinked coatings.

U.S. Pat. No. 5,532,027, to Nordstrom et al. discloses clear film-forming compositions comprising methoxysilane or ethoxysilane functional acrylic polymers. Although such compositions exhibit acid etch resistance, the compositions may not exhibit acceptable storage stability in that the viscosity of the compositions may increase over time.

SUMMARY OF THE INVENTION

It would be desirable to provide a curable film-forming composition that is storage stable while providing acid etch resistance in a cured coating.

In accordance with the present invention, a storage-stable stable curable film-forming composition is provided comprising (i) a crosslinking agent selected from an aminoplast, a blocked polyisocyanate, and mixtures thereof; and (ii) an acrylic polymer containing a plurality of groups of the structure:

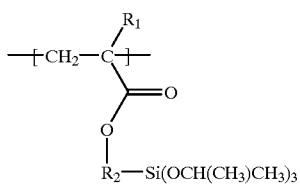

(I)

wherein $R_1$ is hydrogen or methyl, and $R_2$ is a divalent group and optionally containing functional groups that are reactive with the crosslinking agent.

The acrylic polymer is prepared in a solvent medium comprising an alcohol.

Optionally, the film-forming composition contains a separate adjuvant polymer or oligomer containing functional groups that are reactive with the crosslinking agent. In this embodiment, the acrylic polymer of (ii) need not contain functional groups that are reactive with the crosslinking agent. When the adjuvant polymer or oligomer is not used, the acrylic polymer of (ii) must contain the functional groups.

Also provided is a multi-component composite coating composition comprising a base coat deposited from a pigmented film-forming composition, and a transparent top coat applied over the base coat in which the transparent top coat comprises a curable film-forming composition of the present invention.

DETAILED DESCRIPTION

The curable film-forming composition of the present invention is storage-stable. By "storage-stable" is meant that when a sample of the film-forming composition has been adjusted with solvent to an initial #4 Ford cup viscosity of 25 seconds and is maintained at 120° F. (48.9° C.) for 72 hours, the viscosity of the composition increases no more than 60 seconds, preferably no more than 25 seconds, more preferably no more than 12 seconds, most preferably no more than 5 seconds. Such a test is intended to approximate expected long term behavior at room temperature and under typical storage conditions. Unstable compositions will exhibit significant viscosity increases, perhaps to the point of solidification, such as by forming nonflowable gels. Additionally, a composition is considered storage stable when, after a viscosity increase, it can be diluted with a solvent or blend of solvents to a viscosity of 25 seconds and applied to a substrate without loss of appearance properties or cured film properties.

The curable film-forming composition of the present invention contains a crosslinking agent selected from an aminoplast, a blocked isocyanate, and mixtures thereof.

Aminoplasts are obtained from the reaction of formaldehyde with an amine or amide. The most common amines or amides are melamine, urea, or benzoguanamine, and are preferred. While the aldehyde used is most often formaldehyde, other aldehydes such as acetaldehyde, crotonaldehyde, and benzaldehyde may be used.

The aminoplast typically contains imino and methylol groups and preferably at least a portion of the methylol groups are etherified with an alcohol to modify the cure response. Any monohydric alcohol may be employed for this purpose including methanol, ethanol, n-butyl alcohol, isobutanol, and hexanol.

Preferably, the aminoplasts which are used are melamine-, urea-, or benzoguanamine-formaldehyde condensates at least partially etherified with one or more alcohols containing from one to four carbon atoms.

The crosslinking agent used in the curable film-forming composition of the present invention may alternatively be a blocked polyisocyanate. The polyisocyanate can be an aliphatic or an aromatic polyisocyanate or a mixture of the two. Diisocyanates and/or higher polyisocyanates can be used.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis (cyclohexyl isocyanate). Examples of suitable aromatic diisocyanates are p-phenylene diisocyanate, diphenylmethane-4,4'-diisocyanate and 2,4- or 2,6-toluene diisocyanate. Other diisocyanates include 1,3-bis(1-isocyanato-1-methylethyl)benzene. Examples of suitable higher polyisocyanates are triphenylmethane-4,4',4"-triisocyanate, 1,2,4-benzene triisocyanate and polymethylene polyphenyl isocyanate. Other polyisocyanates include biurets and isocyanurates of diisocyanates, including mixtures thereof, such as the isocyanurate of hexamethylene diisocyanate, the biuret of hexamethylene diisocyanate, and the isocyanurate of isophorone diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, alkyl substituted pyrazoles and triazoles, and amines such as dibutyl amine.

Examples of other blocked polyisocyanates include triazine compounds having the formula $C_3N_3(NHCOXR)_3$, wherein X is nitrogen, oxygen, sulfur, phosphorus, or carbon, and R is an alkyl group having one to twelve, preferably one to four, carbon atoms, or mixtures of such alkyl groups. X is preferably oxygen or carbon, more preferably oxygen. R preferably has one to eight carbon atoms, for example, methyl, ethyl, n-propyl, i-propyl, butyl, n-octyl, 2-ethylhexyl. R is preferably a mixture of methyl and butyl groups. Such compounds and the preparation thereof are described in detail throughout U.S. Pat. No. 5,084,541, incorporated herein by reference.

As mentioned above, mixtures of one or more aminoplasts and/or blocked polyisocyanates may be used as the crosslinking agent.

The crosslinking agent is present in the film-forming composition in an amount ranging from about 20 to about 50 percent by weight, preferably about 25 to about 45 percent by weight, based on the total weight of resin solids in the film-forming composition.

The curable film-forming composition of the present invention also contains an acrylic polymer containing a plurality of alkoxysilane groups of the structure:

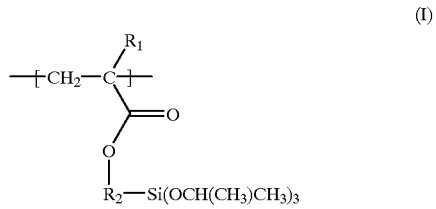

(I)

wherein $R_1$ is hydrogen or methyl, and $R_2$ is a divalent group and optionally containing functional groups that are reactive with the crosslinking agent. $R_1$ is preferably a methyl group. $R_2$ is typically an alkylene or arylene group having about 2 to about 20, preferably about 2 to about 13 carbon atoms. $R_2$ may be aromatic, cycloaliphatic, or linear or branched aliphatic such as methyl methylene, ethylene, methyl ethylene, propylene, dimethyl propylene, butylene, pentylene, hexylene, and the like, and may be substituted. $R_2$ is preferably n-propylene.

The alkoxysilane functional acrylic polymer may be prepared by copolymerizing various ethylenically unsaturated monomers via solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art. The polymerization is preferably performed in a solvent medium comprising an alcohol. Suitable alcohols typically have from about 1 to about 20 carbon atoms and include any alkyl alcohols and glycol ethers known to those skilled in the art. Mixtures of solvents may also be used.

A particularly preferred ethylenically unsaturated monomer which may be used to incorporate groups of Structure (I) into the acrylic polymer is a material available from Witco Corporation (OSi Specialties Group) as SILQUEST Y-11857.

The functional groups on the acrylic polymer may be one or more of active hydrogen groups such as hydroxyl, carboxyl, amino, amido, urea and carbamate, and are preferably primary or secondary hydroxyl. Hydroxyl functionality may be incorporated into the polymer by using ethylenically unsaturated hydroxyalkyl functional monomers to prepare the acrylic polymer. Suitable ethylenically unsaturated hydroxyalkyl functional monomers used to prepare the acrylic polymer include hydroxyalkyl functional acrylates and methacrylates such as hydroxyethyl acrylate, hydroxyethyl methacrylate, hydroxypropyl acrylate, hydroxypropyl methacrylate, 4-hydroxybutyl acrylate, 4-hydroxybutyl methacrylate and the like. Mixtures of these hydroxyalkyl functional monomers may also be used.

The hydroxyl groups in the acrylic polymer may also be beta-hydroxy ester groups derived from the reaction of an ethylenically unsaturated, epoxy functional monomer and a saturated carboxylic acid having about 13 to about 20 carbon atoms; or an ethylenically unsaturated acid functional monomer and an epoxy compound containing at least 5 carbon atoms which is not polymerizable with the ethylenically unsaturated acid functional monomer.

When the beta-hydroxy ester functional monomer is a reaction product of an ethylenically unsaturated, epoxy functional monomer and a saturated carboxylic acid having about 13 to about 20 carbon atoms, examples of ethylenically unsaturated, epoxy functional monomers include glycidyl acrylate, glycidyl methacrylate, allyl glycidyl ether, methallyl glycidyl ether, 1:1 (molar) adducts of ethylenically unsaturated monoisocyanates such as meta-isopropenyl-alpa,alpha,-dimethylbenzyl isocyanate with hydroxyl functional monoepoxides such as glycidol, and glycidyl esters of polymerizable polycarboxylic acids such as maleic acid, fumaric acid, and crotonic acid. Preferred are the epoxy-functional acrylates such as glycidyl acrylate, epoxy functional methacrylates such as glycidyl methacrylates, or mixtures thereof. Glycidyl methacrylate is particularly preferred.

Examples of suitable saturated carboxylic acids include saturated monocarboxylic acids such as stearic acid and isostearic acid. Monocarboxylic acids are preferred. As used herein the term "saturated" as in the phrase "saturated monocarboxylic acid" is intended to denote the absence of ethylenic unsaturation but is not intended to exclude aromatic unsaturation as found, for example, in a benzene ring.

The beta-hydroxy ester functional monomer may be prepared by esterifying the saturated carboxylic acid and unsaturated epoxy functional monomer prior to polymerization with the other monomers. The resultant reaction product may then be addition polymerized, for example, by free radical initiated polymerization techniques, with the other monomers.

The esterification and polymerization reactions are generally conducted at from about 80° C. to about 170° C., preferably from about 120° C. to about 155° C. During esterification of the saturated carboxylic acid and unsaturated epoxy functional monomer, it may be desirable to avoid temperatures in excess of about 120° C. so as to minimize or avoid premature polymerization of the unsaturated epoxy functional monomer. Moreover, the esterification is usually done in the presence of a catalyst for promoting the epoxy/acid reaction such as tertiary amine, phosphine, zinc, or tin catalyst. A free radical inhibitor may be used to inhibit polymerization.

In conducting the subsequent polymerization reaction, the reactive ingredients are heated, typically in the presence of a free radical initiator and optionally a chain transfer agent, in an organic solvent comprising an alcohol in which the ingredients as well as the resultant polymer product are compatible. Typically, the organic solvent is charged to a reaction vessel and heated to reflux, optionally under an inert atmosphere. The ethylenically unsaturated beta-hydroxy functional monomer and other monomers and free radical initiator are added slowly to the refluxing reaction mixture. After the addition is complete, some additional initiator may be added and the reaction mixture held at an elevated temperature to complete the reaction.

When the beta-hydroxy ester functional monomer is a reaction product of an ethylenically unsaturated acid functional monomer and an epoxy compound containing at least 5 carbon atoms which is not polymerizable with the ethylenically unsaturated acid functional monomer, examples of ethylenically unsaturated acid functional monomers include monocarboxylic acids such as acrylic acid, methacrylic acid, and crotonic acid; dicarboxylic acids such as itaconic acid, maleic acid, and fumaric acid; and monoesters of dicarboxylic acids such as monobutyl maleate and monobutyl itaconate. Acrylic acid and methacrylic acid are preferred.

The epoxy compound does not contain ethylenic unsaturation which would participate in free radical initiated polymerization with the unsaturated acid monomer. Examples of such epoxy compounds are glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

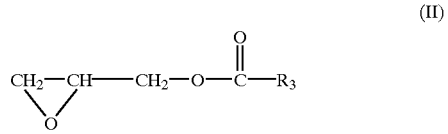

(II)

wherein $R_3$ is a hydrocarbon radical containing from about 4 to about 26 carbon atoms. Preferably, $R_3$ is a branched hydrocarbon radical, more preferably a tertiary aliphatic group of about 8 to about 10 carbon atoms such as neopentanoate, neoheptanoate, and neodecanoate. Glycidyl esters of commercially available mixtures of tertiary aliphatic carboxylic acids such as those available from Shell Chemical Company as VERSATIC ACID 911 are particularly preferred. The glycidyl esters themselves are also commercially available from Shell Chemical Company as CARDURA E-10 and from Exxon Chemical Co. as GLYDEXX-10. Examples of other epoxy compounds are 1,2-pentene oxide and styrene oxide.

The ethylenically unsaturated acid functional monomer and epoxy compound are typically reacted together in an equivalent ratio (acid to epoxy) of about 1:1. The ethylenically unsaturated acid functional monomer and epoxy compound are preferably pre-esterified prior to free radical initiated polymerization, to prevent gelation of the reaction mixture during polymerization. Reaction conditions and methods are similar to those described earlier.

Optionally, one or more additional ethylenically unsaturated monomers may be used in the preparation of the hydroxyl/alkoxysilane functional acrylic polymer, including aliphatic and aromatic vinyl compounds and alkyl esters of acrylic and methacrylic acid or anhydride.

Suitable vinyl compounds include aromatic vinyl compounds such as styrene and alpha-methyl styrene; nitrites such acrylonitrile and methacrylonitrile; vinyl and vinylidene halides such as vinyl chloride and vinylidene fluoride and vinyl esters such as vinyl acetate.

Suitable alkyl esters of acrylic and methacrylic acid or anhydride, wherein the alkyl portion of the ester contains from about 1 to about 30 carbon atoms, are those in which the alkyl group is linear or branched aliphatic including cycloaliphatic. Suitable monomers include alkyl acrylates such as methyl acrylate, ethyl acrylate, n-butyl acrylate and t-butyl acrylate, 2-ethylhexyl acrylate, isobornyl acrylate, cyclohexyl acrylate, t-butyl cyclohexyl acrylate, trimethyl cyclohexyl acrylate, lauryl acrylate, and the like; alkyl methacrylates, including methyl methacrylate, ethyl methacrylate, n-butyl methacrylate, t-butyl methacrylate, 2-ethylhexyl methacrylate, isobornyl methacrylate, cyclohexyl methacrylate, t-butyl cyclohexyl methacrylate, trimethyl cyclohexyl methacrylate, and lauryl methacrylate. Additional functional acrylic monomers may also be used, such as acrylamides. Mixtures of the above monomers are preferably used.

The acrylic polymer used in the curable film-forming composition typically has a weight average molecular weight of about 2000 to about 20,000, preferably about 6000 to about 12,000, as determined by gel permeation chromatography using a polystyrene standard. The total active hydrogen equivalent weight of the polymer is generally about 300 to about 2000, preferably about 325 to about 650. The alkoxysilane equivalent weight of the polymer is generally about 500 to about 7000, preferably about 1000 to about 7000. The total functionality equivalent weight (active hydrogen plus alkoxysilane) of the polymer is typically about 325 to about 575, preferably about 350 to about 550.

The alkoxysilane functional acrylic polymer is present in the curable film-forming composition in amounts of about 50 to about 80, preferably about 55 to about 75 percent by weight based on the total weight of resin solids in the film-forming composition.

The curable film-forming compositions may optionally contain (iii) an adjuvant polymer or oligomer containing functional groups that are reactive with the crosslinking agent. When the adjuvant polymers or oligomers are used, the acrylic polymer (ii) need not contain functional groups that are reactive with the crosslinking agent. Moreover, when the adjuvant polymers or oligomers are used, the alkoxysilane functional acrylic polymer of component (ii) may be present in the curable film-forming composition in amounts of about 20 to about 75 percent by weight based on the total weight of resin solids in the film-forming composition.

The adjuvant polymer or oligomer of component (iii) may include acrylic polymers, polyester polymers or oligomers, including alkyds, polyepoxide polymers or oligomers, polyether polymers or oligomers, and polyurethane polymers or oligomers. Mixtures may also be used. Note that when the adjuvant polymer or oligomer of component (iii) is an acrylic polymer, it is different from the acrylic polymer of component (ii).

The adjuvant polymer or oligomer contains functional groups that are reactive with the crosslinking agent(s), including one or more of hydroxyl, carboxyl amino, amido, urea, and carbamate groups. Hydroxyl groups are preferred. Polymers and oligomers containing the preferred hydroxyl functionality are described in more detail below.

When component (iii) is an acrylic polymer, the acrylic polymer is a copolymer of one or more active hydrogen functional alkyl esters of acrylic acid or methacrylic acid optionally together with one or more other polymerizable ethylenically unsaturated monomers.

Hydroxyl groups may be incorporated into the acrylic polymer by using hydroxyl functional monomers such as those disclosed above.

Besides acrylic polymers, the adjuvant polymer or oligomer of component (iii) may be an alkyd resin or a polyester. Such polymers and oligomers may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and the alkyd resins contain a portion of free hydroxyl groups, done by using excess polyhydric alcohol during preparation of the polyester or alkyd.

Suitable polyepoxides for use as the adjuvant polymer or oligomer of component (iii) in the film-forming composition of the present invention preferably have at least two 1,2-epoxy groups. The epoxy compounds may be saturated or unsaturated, cyclic or acyclic, aliphatic, alicyclic, aromatic or heterocyclic. As mentioned above, they may contain other functionality such as primary and/or secondary amino and/or hydroxyl groups.

Examples of polyepoxides are those having a 1,2-epoxy equivalency greater than one and preferably about two; that is, polyepoxides which have on average two epoxide groups per molecule. Polyglycidyl ethers of polyhydric alcohols such as cyclic polyols are suitable, as are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. Epoxy group-containing acrylic polymers having other functionality such as hydroxyl can also be used.

The polyepoxides may be chain extended using polyhydroxyl group-containing materials. Examples of polyhydroxyl group-containing materials used to chain extend or increase the molecular weight of the polyepoxide (i. e., through hydroxylepoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

Examples of polyether polyols that may be used as the adjuvant polymer or oligomer of component (iii) in the film-forming compositions of the present invention are polyalkylene ether polyols which include those having the following structural formula:

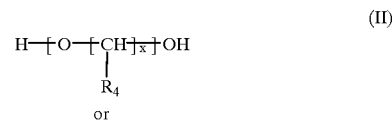

or

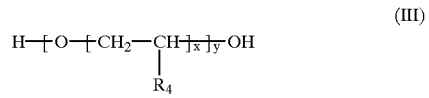

where the substituent $R_4$ is hydrogen or lower alkyl containing from 1 to 5 carbon atoms including mixed substituents, and x is typically from 2 to 6 and y is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst.

Examples of commercially available polyethers include those sold under the names TERATHANE and TERACOL, available from E. I. Du Pont de Nemours and Company, Inc.

Polyurethanes can also be used as the adjuvant polymer or oligomer in the film-forming composition. Among the hydroxyl functional polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

Reaction products of excess low molecular weight polyols such as lower diols and triols with polyisocyanates may also be used as a hydroxyl functional polyurethane polymer or oligomer.

The organic polyisocyanate which is used to prepare the polyurethane can be any of the polyisocyanates disclosed above.

The adjuvant polymer or oligomer of component (iii) is present in the film-forming composition in amounts of about 5 to about 60 percent by weight, preferably about 10 to about 40 percent by weight, based on the total weight of resin solids in the film-forming composition.

Usually the film-forming composition will also preferably contain catalysts to accelerate the cure of the crosslinking agent with reactive groups on the polymer(s). When the crosslinking agent is an aminoplast, examples of suitable catalysts are acidic materials and include acid phosphates and sulfonic acid or a substituted sulfonic acid such as dodecylbenzene sulfonic acid or paratoluene sulfonic acid. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.5 to about 1.5 percent by weight, based on the total weight of resin solids.

Optional ingredients such as hydrolytically reactive organosilicon compounds may be added to the film-forming compositions of the present invention to further improve the viscosity thereof. Such compounds may be represented by the structure: $X_nSi(OR)_{4-n}$ wherein X is an organic radical having from about 1 to about 12 carbon atoms, R is methyl, ethyl, 2-methoxyethyl, 2-ethoxyethyl, or an acyl group containing 5 or less carbon atoms and n is 0, 1, or 2. These compounds are described in detail in U.S. Pat. No. 4,043,953, column 3, line 31 to column 6, line 28, incorporated herein by reference. Other optional ingredients such as, for example, plasticizers, surfactants, thixotropic agents, anti-gassing agents, organic cosolvents, flow controllers, antioxidants, UV light absorbers and similar additives conventional in the art may be included in the composition. These ingredients are typically present at up to about 40% by weight based on the total weight of resin solids.

The film-forming composition of the present invention is typically solventborne. Suitable solvent carriers include the various esters, ethers, and aromatic solvents, including mixtures thereof, that are known in the art of coating formulation. The film-forming composition typically has a total solids content of about 40 to about 80 percent by weight.

The film-forming composition of the present invention may contain color pigments conventionally used in surface coatings and may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

The film-forming composition of the present invention is preferably used as the clear coat layer in a multi-component composite coating composition such as a "color-plus-clear" coating system, which includes at least one pigmented or colored base coat and at least one clear topcoat. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Suitable solventborne coatings include any known to those skilled in the art. Examples include DCT-6373, a solventborne base coat commercially available from PPG Industries, Inc.

As mentioned above, the base coat composition contains pigments. Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to about 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i. e., organic solvent and/or water, out of the base coat film by heating or by an air drying period. Preferably, the heating will only be for a short period of time, sufficient to ensure that the clear coat can be applied to the base coat without dissolving the base coat composition. Suitable drying conditions will depend on the particular base coat composition, and on the ambient humidity with certain waterborne compositions, but in general a drying time of from about 1 to 5 minutes at a temperature of about 68–250° F. (20–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Between coats the previously applied coat may be flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers.

In the curing operation, solvents are driven off and the film-forming materials of the clear coat and the base coat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clear coat is usually from about 0.5 to about 5 mils (about 12.7 to about 127 microns), preferably about 1.2 to about 3 mils (about 30.5 to about 76.2 microns). The resultant crosslinked coating exhibits high gloss and a high level of acid etch resistance. By "high level" it is meant that the resistance of the coating composition to etching by acid rain is significantly improved compared to conventional high solids hydroxyl-aminoplast cured coating compositions.

The invention will be further described by reference to the following examples. Unless otherwise indicated, all parts are by weight.

The following examples (A to D) show the preparation of various alkoxysilane functional acrylic polymers. Examples A and C contain triisopropoxysilane functionality, while Examples B and D are comparative and contain trimethoxysilane functionality.

EXAMPLE A

A triisopropoxysilane functional acrylic polyol containing 10 percent by weight alkoxysilane functional monomer and 30 percent by weight hydroxyalkyl functional monomer was prepared from the following ingredients:

| Ingredients | Weight in grams |
| --- | --- |
| Charge 1 | |
| PROPASOL P[1] | 348.8 |
| Charge 2 | |
| hydroxyethyl methacrylate | 248.4 |
| SILQUEST Y-11857[2] | 82.8 |
| styrene | 165.6 |
| butyl acrylate | 165.6 |
| butyl methacrylate | 165.6 |
| Charge 3 | |
| PROPASOL P | 107.4 |
| LUPERSOL 575[3] | 32.8 |
| Charge 4 | |
| PROPASOL P | 5.2 |
| LUPERSOL 575 | 1.2 |
| Charge 5 | |
| PROPASOL P | 5.2 |
| LUPERSOL 575 | 1.2 |
| Charge 6 | |
| PROPASOL P | 34.8 |
| butyl acetate | 34.8 |

[1]Propylene glycol monopropyl ether
[2]3-methacryloxypropyltriisopropoxysilane, available from Witco Corporation (OSi Specialties Group)
[3]XXX t-amyl peroctoate available from Elf Atochem, North America, Inc.

Charge 1 was added to a reactor equipped with a reflux condenser and heated to reflux under a nitrogen blanket. Charges 2 and 3 were begun at the same time and added to the reactor over a period of 3 hours. Upon completion of Charges 2 and 3, Charge 4 was added to the reactor as a rinse for Charges 2 and 3 and the mixture was held at 140° C. for a period of 1 hour. Charge 5 was added and the reaction held at constant temperature for 1 hour. Charge 6 was then added to the reactor as a final thinning solvent. The resulting resin had a theoretical solids of about 60% and a total functionality equivalent weight of 383.1.

EXAMPLE B (Comparative)

A trimethoxysilane functional acrylic polyol containing 10 percent by weight alkoxysilane functional monomer (3-methacryloxypropyltrimethoxysilane, available from Witco Corporation (OSi Specialties Group) as A-174) and 30 percent by weight hydroxyalkyl functional monomer was prepared as in Example A. The resultant polymer had a measured solids content of 59.8%, a viscosity of 20.4 Stokes, and a total functionality equivalent weight of 369.0.

EXAMPLE C

A triisopropoxysilane functional acrylic polyol containing 20 percent by weight alkoxysilane functional monomer and 20 percent by weight hydroxyalkyl functional monomer was prepared as in Example A. The resulting resin had a theoretical solids of about 60% and a total functionality equivalent weight of 467.3.

EXAMPLE D (Comparative)

A trimethoxysilane functional acrylic polyol containing 20 percent by weight alkoxysilane functional monomer (A-174) and 20 percent by weight hydroxyalkyl functional monomer was prepared as in Example A. The resultant polymer had a measured solids content of 60.5%, a viscosity of 15.68 Stokes and a total functionality equivalent weight of 425.5.

Examples 1 to 4 illustrate the preparation of clear film-forming compositions using the acrylic polymers prepared in Examples A to D. The ingredients were mixed together in the order listed:

| INGREDIENT | Example 1 | Example 2 | Example 3 | Example 4 |
| --- | --- | --- | --- | --- |
| SOLVESSO 100[1] | 20.0 | 20.0 | 20.0 | 20.0 |
| TINUVIN 328[2] | 1.5 | 1.5 | 1.5 | 1.5 |
| TINUVIN 900[3] | 1.5 | 1.5 | 1.5 | 1.5 |
| TINUVIN 123[4] | 0.6 | 0.6 | 0.6 | 0.6 |
| TINUVIN 292[5] | 0.4 | 0.4 | 0.4 | 0.4 |
| CYMEL 1130[6] | 35.0 | 35.0 | 35.0 | 35.0 |
| Polybutylacrylate[7] | 0.67 | 0.67 | 0.67 | 0.67 |
| DIPA blocked DDBSA[8] | 3.33 | 3.33 | 3.33 | 3.33 |
| Acrylic polymer of Example A | 108.33 | — | — | — |
| Acrylic polymer of Example B | — | 108.7 | — | — |
| Acrylic polymer of Example C | — | — | 110.5 | — |
| Acrylic polymer of Example D | — | — | — | 107.4 |

[1]blend of aromatic solvents available from Exxon Chemicals America.
[2]2-(2'-Hydroxy-3',5'-ditert-amylphenyl) benzotriazole UV light stabilizer available from Ciba-Geigy Corp.
[3]2-(2'-hydroxy-benzotriazol-2-yl)-4,6-bis(methyl-1-phenylethyl)phenol available from Ciba-Geigy Corp.
[4]Sterically hindered tertiary amine light stabilizer available from Ciba Geigy Corporation.
[5]Bis(1,2,2,6,6-pentamethyl-4-piperidinyl) sebacate hindered amine stabilizer available from Ciba-Geigy Corp.
[6]Methylated, butylated melamine formaldehyde resin available from CYTEC Industries, Inc.
[7]Flow control agent having a Mw of about 6700 and a Mn of about 2600, made in xylene at 62.5% solids.
[8]30% solution of dodecylbenzenesulfonic acid blocked with diisopropanolamine, in alcohol.

Viscosities of the film-forming compositions of Examples 1 to 4 were measured at room temperature using a #4 Ford cup. The compositions were stored for 72 hours in a 120° F.

(48.9° C.) hot room. The compositions were removed, allowed to cool to room temperature, and the viscosities again measured. Results are reported in Table I below.

TABLE I

| Example | INITIAL VISCOSITY | VISCOSITY AFTER 3 DAYS @ 120° F. |
|---|---|---|
| 1 | 24.34 seconds @ 71.40° F. | 74.07 seconds @ 75.4° F. |
| 2 (Comparative) | 24.52 seconds @ 72.9° F. | Gelled |
| 3 | 23.23 seconds @ 70.7° F. | 34.43 seconds @ 74.5° F. |
| 4 (Comparative) | 24.81 seconds @ 73.4° F. | Gelled |

The data reported in Table I indicate that film-forming compositions of the present invention are more stable than compositions prepared from polymers containing trimethoxysilane functionality.

Examples E to G are comparative, illustrating the preparation of acrylic polymers having total functionality equivalent weights outside the scope of the invention.

EXAMPLE E (Comparative)

A triisopropoxysilane functional acrylic polyol containing 30 percent by weight alkoxysilane functional monomer and 10 percent by weight hydroxyalkyl functional monomer was prepared as in Example A. The resulting resin had a measured solids of 58.25% and a total functionality equivalent weight of 598.8.

EXAMPLE F (Comparative)

A triisopropoxysilane functional acrylic polyol containing 60 percent by weight alkoxysilane functional monomer and 20 percent by weight hydroxyalkyl functional monomer was prepared as in Example A. The resulting resin had a measured solids of 55.53% and a total functionality equivalent weight of 299.4.

EXAMPLE G (Comparative)

A triisopropoxysilane functional acrylic polyol containing 20 percent by weight alkoxysilane functional monomer and 40 percent by weight hydroxyalkyl functional monomer was prepared as in Example A. The resulting resin had a measured solids of 58.46% and a total functionality equivalent weight of 272.5.

Examples 5 to 7 are all comparative and illustrate the preparation of clear film-forming compositions using the acrylic polymers prepared in Examples E to G. The ingredients were mixed together in the order listed (amounts given are in grams):

| INGREDIENT | Example 5 | Example 6 | Example 7 |
|---|---|---|---|
| SOLVESSO 100 | 20.0 | 20.0 | 20.0 |
| TINUVIN 328 | 1.5 | 1.5 | 1.5 |
| TINUVIN 900 | 1.5 | 1.5 | 1.5 |
| TINUVIN 123 | 0.6 | 0.6 | 0.6 |
| TINUVIN 292 | 0.4 | 0.4 | 0.4 |
| CYMEL 1130 | 35.0 | 35.0 | 35.0 |
| Polybutylacrylate | 0.67 | 0.67 | 0.67 |
| DIPA blocked DDBSA | 3.33 | 3.33 | 3.33 |
| Acrylic polymer of Example E | 111.6 | — | — |
| Acrylic polymer of Example F | — | 117.05 | — |
| Acrylic polymer of Example G | — | — | 111.2 |

The film-forming compositions of Examples 1,3, and 5–7 and a conventional hydroxyl acrylic/aminoplast clear coat available from PPG Industries, Inc. as DCT-1002B (used as a control) were applied to a pigmented base coat to form color-plus-clear composite coatings over primed steel substrates. The base coat used is commercially available from PPG Industries, Inc. and is identified as DCT-6373 (black in color).

The base coat was spray applied in two coats to electrocoated steel panels at a temperature of about 75° F. After the second base coat application, a flash time of about 5 minutes was allowed at 75° F. before the application of the clear coating composition. The clear coating compositions of Examples 1,3, and 5–7 and the control were each applied to a basecoated panel in two coats with a ninety second flash at 75° F. allowed between coats. The composite coating was allowed to air flash at 75° F. for 10 minutes before baking. One panel for each clear coat example was baked for 25 minutes at 285° F. to cure both the base coat and the clear coat. These panels were used to test acid etch resistance and appearance. The results for acid etch resistance and appearance are shown in the Table II below. The examples are listed in order of increasing total functionality equivalent weight.

TABLE II

| Clear coat Example | Equivalent Weight of polymer | Gloss/DOI[1] | Acid Etch Resistance[2] |
|---|---|---|---|
| 7 (Comparative) | 272.5 | 89.6/89 | 9 |
| 6 (Comparative) | 299.4 | 85.7/96 | 10 |
| 1 | 383.1 | 91.0/88 | 8 |
| 3 | 467.3 | 90.3/92 | 7 |
| 5 (Comparative) | 598.8 | 89.6/94 | 10 |
| Control | — | 91.0/94 | 10 |

[1]20° Gloss measured by a MacBeth NOVOGLOSS ™ Statistical 20 degree glossmeter. Higher numbers indicate better gloss. DOI (distinctness of image) measured using a Dorigon II DOI meter from Hunter Lab. Higher numbers indicate better clarity.
[2]A solution of 29.8 grams deionized water and 1.5 grams 0.2N sulfuric acid is prepared. Eight droplets of 50 microliters each (as two rows of four) are placed on a cured test panel (at least 1.5 × 4 inches (3.81 × 10.16 cm) in area). The droplets are applied using an Octapette 8-tip dispenser available from Corning Costar. The spotted panels are placed in a 120° F. (48.9° C.) oven for 20 minutes. The panels are removed and respotted. This processis repeated a total of three cycles (60 minutes of baking). The panels are then washed with soap and water and rated against laboratory standards for acid etch resistance on a scale of 0 (no damage) to 10 (severe etching).

The data in the table indicate that coating compositions of the present invention exhibit improved acid etch resistance compared to conventional hydroxyl-aminoplast cured systems. Moreover, the coating compositions of the present invention exhibit very good gloss properties.

Examples H and I illustrate the preparation of beta-hydroxy ester functional acrylic polymers. Example H is comparative and does not contain alkoxysilane functionality. Example I contains 10 percent alkoxysilane functionality, based on the total solid weight of monomers used to prepare the polymer.

EXAMPLE H (Comparative)

This example illustrates the preparation of an acrylic polyol with beta-hydroxy ester groups.

A reaction vessel equipped with stirrer, thermocouple, condenser and addition funnels with pumps was charged with 2168.8 g SOLVESSO 100 solvent, 21.7 g triphenyl phosphite and 578.8 g isostearic acid (available as PRISORINE 3505 from Unichema Chemicals, Inc.) and heated to reflux (about 168° C.). Two feeds, identified herein as Feed A and Feed B, were gradually and simultaneously added to the vessel over a period of two hours while the contents of the vessel were maintained at reflux conditions. Feed A consisted of a mixture of 112.8 g di-t-amyl peroxide (available from Elf-Atochem) and 957.9 g SOLVESSO 100. Feed B consisted of a mixture of 1301.5 styrene, 1014.1 g hydroxypropyl acrylate, 780.8 g butyl acrylate, 373.5 g butyl methacrylate and 289 g glycidyl methacrylate. After the addition of the two feeds A and B was complete, the contents of the vessel were allowed to reflux and the acid value was monitored until it reached less than 4.0 (after about 2 hours). The resulting product was allowed to cool and was thinned with 270.0 g of SOLVESSO 100.

The resultant product had a total solids content of 56.1% measured for 1 hour at 110° C.; had a Gardner-Holdt bubble tube viscosity of G; had an acid of 2.7 mg KOH/g; had a hydroxyl value of 72.3 mg KOH/g; had an epoxy equivalent weight of 29,322; had a weight average molecular weight of 6744; had a number average molecular weight of 2860.

EXAMPLE I

This example illustrates the preparation of an acrylic polyol with beta-hydroxy groups and 10% by weight 3-methacryloxypropyltriisopropoxysilane.

A reaction vessel equipped with stirrer, thermocouple, condenser and addition funnels with pumps was charged with 267.5 g SOLVESSO 100, 267.5 g propylene glycol monopropyl ether, and 5.4 g triphenyl phosphite and heated to reflux (about 153° C.). Two feeds, identified herein as Feed A and Feed B, were gradually and simultaneously added to the vessel over a period of two hours while the contents of the vessel were maintained at reflux conditions. Feed A consisted of a mixture of 27.8 g di-t-amyl peroxide, 118.2 g SOLVESSO 100 and 118.2 g propylene glycol monopropyl ether. Feed B consisted of a mixture of 321.1 g styrene, 250.4 g hydroxypropyl acrylate, 120.1 g butyl acrylate, 5.4 g butyl methacrylate, 107.0 g SILQUEST Y-11857 and 214.1 g monomer of glycidyl methacrylate/isostearic acid[1]. After the addition of the two feeds A and B was complete, the contents of the vessel were allowed to reflux for 1 hour. The resulting product was allowed to cool and was thinned with 33.3 g of SOLVESSO 100 and 33.3 g propylene glycol monopropyl ether.

The resultant product had a total solids content of 54.8%; had a Gardner-Holdt bubble tube viscosity of G; had an acid of 0.6 mg KOH/g; had an epoxy equivalent weight of >100,000; had a weight average molecular weight of 8948; had a number average molecular weight of 3753; and had a total functionality equivalent weight of 387.7.

[1]The beta-hydroxy functional monomer of glycidyl methacrylate/isostearic acid was prepared as follows:

A reaction vessel equipped with stirrer, thermocouple, condenser, an addition funnel and a nitrogen/air (3/1) sparge tube was charged with 1425.0 g isostearic acid, 5.34 g zinc octoate (available as a 49% solution in mineral spirits from OMG Americas, Inc.) and 0.43 g hydroquinone methyl ether and heated to 110° C. Glycidyl methacrylate (710.0 g) was added over one hour while maintaining the temperature at less than 115° C. After the addition was complete, the reaction temperature was increased to 115° C. and the vessel contents stirred and the acid value monitored until it until reached less than 5 mg KOH/g (after about 4 hours).

The resultant monomer had an acid value of 2.2 mg KOH/g; had a Brookfield viscosity of 136 cps (#3 spindle at 60 rpm's); had a weight average molecular weight of 727; had a number average molecular weight of 589.

Examples 8 to 11 illustrate the preparation of clear film-forming compositions using the acrylic polymers prepared in Examples H and I. Examples 8 and 9 are comparative, containing the polymer of Example H, while Examples 10 and 11 illustrate film-forming compositions prepared in accordance with the present invention. Examples 8 and 10 contain a mixture of aminoplast and blocked isocyanate as crosslinking agent. The ingredients were mixed together in the order listed (amounts given are in grams):

| INGREDIENT | Example 8 | Example 9 | Example 10 | Example 11 |
|---|---|---|---|---|
| SOLVESSO 100 | 15.0 | 15.0 | 15.0 | 15.0 |
| Ethanol | 6.0 | 6.0 | 6.0 | 6.0 |
| EKTAPRO EEP[1] | 3.6 | 3.6 | 3.6 | 3.6 |
| Polybutylacrylate | 0.40 | 0.40 | 0.40 | 0.40 |
| BYK 300[2] | 0.54 | 0.54 | 0.54 | 0.54 |
| TINUVIN 328 | 1.60 | 1.60 | 1.60 | 1.60 |
| TINUVIN 292 | 0.82 | 0.82 | 0.82 | 0.82 |
| CYMEL 202[3] | 31.25 | 31.25 | 31.25 | 31.25 |
| SETALUX C91795[4] | 7.0 | 7.0 | 7.0 | 7.0 |
| Dodecylbenzenesulfonic acid (DDBSA) | 0.70 | 0.70 | 0.70 | 0.70 |
| Dibutyltindilaurate (DBTDL) | 0.50 | 0.50 | 0.50 | 0.50 |
| Acrylic polymer of Example H | 112.66 | 126.02 | — | — |
| Acrylic polymer of Example I | — | — | 115.3 | 129.0 |
| VESTANAT B1358A[5] | 12.0 | — | 12.0 | — |

[1]Ethyl-3-ethoxy propionate available from Eastman Chemicals
[2]polysiloxane copolymer solution available from BYK-Chemie USA
[3]Partially methylated and butylated, high imino melamine formaldehyde resin available from CYTEC Industries, Inc.
[4]sag control agent available from AKZO NOBEL Resins
[5]An isocyanurate trimer of isophorone diisocyanate blocked with methyl ethyl ketoxime available from Hüls America, Inc.

The film-forming compositions of Examples 8–11 were applied to a pigmented base coat to form color-plus-clear composite coatings over primed steel substrates. The base coat used was black in color and is commercially available from PPG Industries, Inc. as 94902.

The base coat was spray applied in two coats to the panels at a temperature of about 75° F. After the second base coat application, a flash time of about 90 seconds was allowed at 75° F. before the application of the clear coating composition. The clear coating compositions of Examples 8–11 were each applied to a basecoated panel in two coats with a ninety second flash at 75° F. allowed between coats. The composite coating was allowed to air flash at 75° F. for 10 minutes before baking. One panel for each clear coat example was baked for 30 minutes at 285° F. to cure both the base coat and the clear coat. These panels were used to test acid etch resistance and appearance. The results for acid etch resistance and appearance are shown in the Table III below.

17

TABLE III

| Example | Gloss | DOI | Acid Etch Resistance |
|---|---|---|---|
| 8 (Comparative) | 92.9 | 97 | 9 |
| 9 (Comparative) | 93.5 | 96 | 10 |
| 10 | 92.6 | 96 | 6 |
| 11 | 90.9 | 96 | 7 |

The data in the table indicate that coating compositions of the present invention exhibit improved acid etch resistance compared to compositions that do not contain alkoxysilane functionality, with or without blocked isocyanates.

We claim:

1. A storage-stable, curable film-forming composition comprising:

(i) a crosslinkig agent selected from an aminoplast, a blocked polyisocyanate, and mixtures thereof; and (ii) an acrylic polymer containing hydroxyl groups which are reactive with the crosslinking agent and further containing a plurality of alkoxysilane groups of the structure:

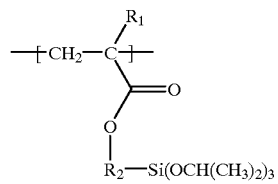

wherein $R_1$ is hydrogen or methyl, and $R_2$ is a divalent group containing from about 2 to about 20 carbon atoms; said acrylic polymer is prepared in a solvent medium comprising an alcohol; said acrylic polymer having a total functionality equivalent weight based on hydroxyl plus alkoxy silane of 325 to 575; and when a sample of the film-forming composition has been adjusted with solvent to an initial No. 4 Ford cup viscosity of 25 seconds and is maintained at 48.9° C. for 72 hours, the viscosity of the composition increases no more than 60 seconds.

2. The curable film-forming composition of claim 1 wherein $R_1$ is a methyl group and $R_2$ is an n-propylene group.

3. The curable film-forming composition of claim 1 wherein the hydroxyl groups of the acrylic polymer of component (ii) are primary and/or secondary hydroxyl groups.

4. The curable film-forming composition of claim 3 wherein hydroxyl groups in the acrylic polymer of component (ii) are beta-hydroxy groups derived from the reaction of an ethylenically unsaturated, epoxy functional monomer and a saturated carboxylic acid having about 13 to about 20 carbon atoms, or an ethylenically unsaturated acid functional monomer and an epoxy compound containing at least 5 carbon atoms which is not polymerizable with the ethylenically unsaturated acid functional monomer.

5. The curable film-forming composition of claim 1 wherein the crosslinking agent is a triazine compound having the formula $C_3N_3(NHCOOR)_3$ where R is an alkyl group having one to twelve carbon atoms or mixtures of such alkyl groups.

6. The curable film-forming composition of claim 1 wherein the acrylic polymer of component (ii) is present in an amount of about 50 to about 80 percent by weight, based on the total weight of resin solids in the film-forming composition.

7. The curable film-forming composition of claim 1 further comprising a hydrolytically reactive organosilicon compound having the structure: $X_nSi(OR)_{4-n}$ wherein X is an organic radical having from about 1 to about 12 carbon atoms; R is methyl, ethyl, 2-methoxyethyl, 2-ethoxyethyl, or an acyl group containing 5 or less carbon atoms; and n is 0, 1, or 2.

8. The curable film-forming composition of claim 1 in which the acrylic polymer of component (ii) has a weight average molecular weight of 6000 to 12000.

9. A multi-component composite coating composition comprising a base coat deposited from a pigmented film-forming composition and a transparent top coat applied over the base coat in which the transparent top coat is deposited from a clear film-forming composition comprising:

(i) a crosslinking agent selected from an aminoplast, a blocked polyisocyanate, and mixtures thereof; and (ii) an acrylic polymer containing hydroxyl groups that are reactive with the crosslinking agent and further containing a plurality of alkoxysilane groups of the structure:

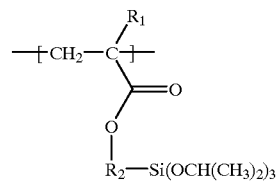

wherein $R_1$ is hydrogen or methyl, and $R_2$ is a divalent group containing from about 2 to about 20 carbon atoms; and wherein said acrylic polymer is prepared in a solvent medium comprising an alcohol; said acrylic polymer having a total functionality equivalent weight based on hydroxyl plus alkoxy silane of 325 to 575; and when a sample of the film-forming composition has been adjusted with solvent to an initial No. 4 Ford cup viscosity of 25 seconds and is maintained at 48.9° C. for 72 hours, the viscosity of the composition increases no more than 60 seconds.

10. The multi-component composite coating composition of claim 9 wherein $R_1$ is a methyl group and $R_2$ is an n-propylene group.

11. The multi-component composite coating composition of claim 9 wherein the hydroxyl groups of the acrylic polymer of component (ii) are primary and/or secondary hydroxyl groups.

12. The multi-component composite coating composition of claim 9 wherein hydroxyl groups in the acrylic polymer of component (ii) are beta-hydroxy groups derived from the reaction of an ethylenically unsaturated, epoxy functional monomer and a saturated carboxylic acid having about 13 to about 20 carbon atoms, or an ethylenically unsaturated acid functional monomer and an epoxy compound containing at least 5 carbon atoms which is not polymerizable with the ethylenically unsaturated acid functional monomer.

13. The multi-component composite coating composition of claim 9 wherein the crosslinking agent is a triazine compound having the formula $C_3N_3(NHCOOR)_3$ where R is an alkyl group having one to twelve carbon atoms or mixtures of such alkyl groups.

14. The multi-component composite coating composition of claim 9 wherein the acrylic polymer of component (ii) is present in the clear film-forming composition an amount of about 50 to about 80 percent by weight, based on the total weight of resin solids in the clear film-forming composition.

15. The multi-component composite coating composition of claim 9 wherein the clear film-forming composition further comprises a hydrolytically reactive organosilicon compound having the structure: $X_nSi(OR)_{4-n}$ wherein X is an organic radical having from about 1 to about 12 carbon atoms; R is methyl, ethyl, 2-methoxyethyl, 2-ethoxyethyl, or an acyl group containing 5 or less carbon atoms; and n is 0, 1, or 2.

16. The multi-component composite coating composition of claim 9 in which the acrylic polymer component (ii) has a weight average molecular weight of 6000 to 12000.

17. A storage-stable, curable film-forming composition comprising:
  (i) a crosslinking agent selected from an aminoplast, a blocked polyisocyanate, and mixtures thereof;
  (ii) an acrylic polymer containing a plurality of alkoxysilane groups of the structure:

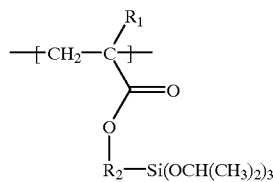

wherein $R_1$ is hydrogen or methyl, and $R_2$ is a divalent group containing from about 2 to about 20 carbon atoms; and
  (iii) an adjuvant polymer or oligomer containing hydroxyl groups that are reactive with the crosslinking agent; and wherein the acrylic polymer of component (ii) is prepared in a solvent medium comprising an alcohol: said acrylic poler (ii) and said adjuvant polymer (iii) having a total functionality equivalent weight based on hydroxy plus alkoxy silane of 325 to 575 and when a sample of the film-forming composition has been adjusted with solvent to an intial No. 4 Ford cup viscosity of 25 seconds and is maintained at 48.9° C. for 72 hours, the viscosity the composition increases no more than 60 seconds.

18. The curable film-forming composition of claim 17 wherein $R_1$, is a methyl group and $R_2$ is an n-propylene group.

19. The curable film-forming composition of claim 17 wherein the acrylic polymer of component (ii) fiber contains hydroxyl groups that are reactive with the crosslinking agent.

20. The curable film-forming composition of claim 19 wherein functional groups on the acrylic polymer are primary and/or secondary hydroxyl.

21. The curable film-forming composition of claim 20 wherein hydroxyl functionality in the acrylic polymer of component (ii) comprises beta-hydroxy groups derived from the reaction of an ethylenically unsaturated, epoxy functional monomer and a saturated carboxylic acid having about 13 to about 20 carbon atoms, or an ethylenically unsaturated acid functional monomer and an epoxy compound containing at least 5 carbon atoms which is not polymerizable with the ethylenically unsaturated acid functional monomer.

22. The curable film-forming composition of claim 17 wherein the crosslinking agent is a triazine compound having the formula $C_3N_3(NHCOOR)_3$ where R is an alkyl group containing one to twelve carbon atoms or mixtures of such alkyl groups.

23. The curable film-forming composition of claim 17 wherein the acrylic polymer of component (ii) is present in an amount of about 20 to about 75 percent by weight, based on the total weight of resin solids in the film-forming composition.

24. The curable film-forming composition of claim 17 in which the acrylic polymer of component (ii) has a weight average molecular weight of 6000 to 12000.

25. The curable film-forming composition of claim 17 wherein the adjuvant polymer or oligomer of component (iii) is present in an amount of about 5 to about 60 percent by weight, based on the total weight of resin solids in the film-forming composition.

26. The curable film-forming composition of claim 17 wherein the adjuvant polymer or oligomer of component (iii) is selected from the group consisting of acrylic polymers, polyester polymers, polyester oligomers, polyepoxide polymers, polyepoxide oligomers, polyether polymers, polyether oligomers, polyurethane polymers, polyurethane oligomers, and mixtures thereof.

27. The curable film-forming composition of claim 17 wherein the acrylic polymer or oligomer of component (iii) is a hydroxyl functional acrylic polymer different from component (ii).

28. The curable film-forming composition of claim 17 further comprising a hydrolytically reactive organosilicon compound having the structure: $X_nSi(OR)_{4-n}$ wherein X is an organic radical having from about 1 to about 12 carbon atoms; R is methyl, ethyl, 2-methoxyethyl, 2-ethoxyethyl, or an acyl group containing 5 or less carbon atoms; and n is 0, 1, or 2.

29. A multi-component composite coating composition comprising a base coat deposited from a pigmented film-forming composition and a transparent top coat applied over the base coat in which the transparent top coat is deposited from a clear film-forming composition comprising:
  (i) a crosslinling agent selected from an aminoplast, a blocked polyisocyanate, and mixtures thereof;
  (ii) an acrylic polymer containing a plurality of alkoxysilane groups of the structure:

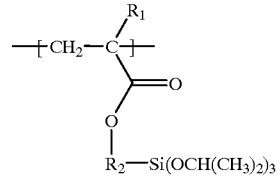

wherein $R_1$ is hydrogen or methyl, and $R_2$ is a divalent group containing from about 2 to about 20 carbon atoms; and
  (iii) an adjuvant polymer or oligomer containing hydroxyl groups that are reactive with the crosslinling agent; and wherein the acrylic polymer of component (ii) is prepared in a solvent medium comprising all alcohol; said arcylic polymer (ii) and said adjuvant polymer (iii) having a total functionally equvalent weight based on hydroxyl plus alkoxy silane of 325 to 575 and when a sample of the film-forming composition has been adjusted with solvent to an initial No. 4 Ford cup viscosity of 25 seconds and is maintained at 48.9° C. for 72 hours, the viscosity of the composition increases no more than 60 seconds.

30. The multi-component composite coating composition of claim 29 wherein $R_1$ is a methyl group and $R_2$ is an n-propylene group.

31. The multi-component composite coating composition of claim 29 wherein the acrylic polymer of component (ii) further contains hydroxyl groups that are reactive with the crosslinking agent.

32. The multi-component composite coating composition of claim 31 wherein functional groups on the acrylic polymer of component (ii) are primary and/or secondary hydroxyl.

33. The multi-component composite coating composition of claim 32 wherein hydroxyl functionality in the acrylic polymer of component (ii) comprises beta-hydroxy groups derived from the reaction of an ethylenically unsaturated, epoxy functional monomer and a saturated carboxylic acid having about 13 to about 20 carbon atoms, or an ethylenically unsaturated acid functional monomer and an epoxy compound containing at least 5 carbon atoms which is not polymerizable with the ethylenically unsaturated acid functional monomer.

34. The multi-component composite coating composition of claim 29 wherein the crosslinking agent is a triazine compound having the formula $C_3N3(NHCOOR)_3$ where R is an alkyl group having one to twelve carbon atoms or mixtures of such alkyl groups.

35. The multi-component composite coating composition of claim 29 wherein the acrylic polymer of component (ii) is present in the clear film-forming composition an amount of about 20 to about 75 percent by weight, based on the total weight of resin solids in the clear film-forming composition.

36. The multi-component composite coating composition of claim 29 in which the acrylic polymer of component (ii) has a weight average molecular weight of 6000 to 12000.

37. The multi-component composite coating composition of claim 29 wherein the adjuvant polymer or oligomer of component (iii) is present in the clear film-forming composition an amount of about 5 to about 60 percent by weight, based on the total weight of resin solids in the clear film-forming composition.

38. The multi-component composite coating composition of claim 29 wherein the adjuvant polymer or oligomer of component (iii) is selected from the group consisting of acrylic polymers, polyester polymers, polyester oligomers, polyepoxide polymers, polyepoxide oligomers, polyether polymers, polyether oligomers, polyurethane polymers, polyurethane oligomers, and mixtures thereof.

39. The multi-component composite coating composition of claim 29 wherein the adjuvant polymer or oligomer of component (ii) is a hydroxyl functional acrylic polymer different from component (ii).

40. The multi-component composite coating composition of claim 29 wherein the clear film-forming composition further comprises a hydrolytically reactive organosilicon compound having the structure: $X_nSi(OR)_{4-n}$ wherein X is an organic radical having from about 1 to about 12 carbon atoms; R is methyl, ethyl, 2-methoxyethyl, 2-ethoxyethyl, or an acyl group containing 5 or less carbon atoms; and n is 0, 1, or 2.

* * * * *

UNITED STATES PATENT AND TRADEMARK OFFICE
CERTIFICATE OF CORRECTION

PATENT NO. : 5,965,272
DATED : October 12, 1999
INVENTOR(S) : Donnelly et al.

It is certified that error appears in the above-identified patent and that said Letters Patent is hereby corrected as shown below:

Col. 17, line 18, "crosslinkig" should be --crosslinking--.
Col. 19, line 38, "poler" should be --polymer--
Col. 19, line 40, "hydroxy" should be --hydroxyl--.
Col. 19, line 44, insert the word --of-- after "viscosity".
Col. 19, line 50, "fiber" should be --further--.
Col. 20, line 39, "crosslinling" should be --crosslinking--.
Col. 20, line 57, "crosslinling" should be --crosslinking--.
Col. 20, line 59, "all" should be --an--.
Col. 20, line 60, "arcylic" should be --acrylic--.
Col. 20, line 61, "functionally" should be --functionality--.
Col. 21, line 24, the second "3" in the formula should be a subscript.
Col. 22, line 20, "(ii)" should be --(iii)--.

Signed and Sealed this

Twelfth Day of September, 2000

Attest:

Q. TODD DICKINSON

*Attesting Officer*  *Director of Patents and Trademarks*